(12) United States Patent
Rodriguez et al.

(10) Patent No.: US 11,347,464 B2
(45) Date of Patent: May 31, 2022

(54) UNIQUE DISPLAY OUTPUT CONTROL FOR DUAL DISPLAYS

(71) Applicant: NCR Corporation, Atlanta, GA (US)

(72) Inventors: Omar Javier Rodriguez, College Station, TX (US); Justin David Orr, Pinehurst, TX (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/663,014

(22) Filed: Jul. 28, 2017

(65) Prior Publication Data
US 2019/0079718 A1    Mar. 14, 2019

(51) Int. Cl.
| | |
|---|---|
| *G06F 3/14* | (2006.01) |
| *G06F 9/445* | (2018.01) |
| *G06F 9/4401* | (2018.01) |
| *G09G 5/00* | (2006.01) |
| *G09G 5/36* | (2006.01) |

(52) U.S. Cl.
CPC .......... *G06F 3/1438* (2013.01); *G06F 3/1423* (2013.01); *G06F 3/1446* (2013.01); *G06F 9/4411* (2013.01); *G06F 9/44505* (2013.01); *G09G 5/00* (2013.01); *G09G 5/006* (2013.01); *G09G 5/363* (2013.01); *G06F 9/4403* (2013.01); *G09G 2330/026* (2013.01)

(58) Field of Classification Search
CPC .. G06F 3/1438; G06F 3/1423; G06F 9/44505; G06F 9/4411; G06F 3/1446; G06F 9/4403; G06F 11/20; G09G 5/00; G09G 5/363; G09G 5/006; G09G 2330/026
See application file for complete search history.

(56) References Cited

U.S. PATENT DOCUMENTS

| | | | | |
|---|---|---|---|---|
| 5,361,078 A | * | 11/1994 | Caine | G06F 3/1446 345/1.3 |
| 5,694,150 A | * | 12/1997 | Sigona | G06F 3/038 715/856 |
| 6,088,004 A | * | 7/2000 | Domae | G06F 3/1423 345/1.1 |
| 9,324,294 B2 | | 4/2016 | Lin et al. | |

(Continued)

FOREIGN PATENT DOCUMENTS

| | | |
|---|---|---|
| EP | 3012829 A1 | 4/2017 |
| WO | 2014/051622 A1 | 4/2014 |

OTHER PUBLICATIONS

"A method of boot node recovery in a partitioned environment using uEFI boot device selection (BDS) support", ipm.com Journal, ip.com Inc., West Henrietta, NY, US, Apr. 13, 2009 (Apr. 13, 2009), XP013131008, ISSN: 1533-0001 the whole document.

(Continued)

*Primary Examiner* — David D Davis
(74) *Attorney, Agent, or Firm* — Schwegman, Lundberg & Woessner

(57) ABSTRACT

A single device having a display manager that dynamically controls dual unique output formatting for multiple displays. The display manager detects changes made in configuration files having configuration instructions representing formatting instructions for each of the displays. Detected changes are dynamically processed by the display manager to alter, in real time, formatting of content being rendered on the displays.

16 Claims, 4 Drawing Sheets

(56) References Cited

U.S. PATENT DOCUMENTS

| | | | | |
|---|---|---|---|---|
| 2009/0217084 A1* | 8/2009 | Ebbert | ............ | G06F 3/1454 |
| | | | | 714/5.1 |
| 2011/0270948 A1* | 11/2011 | Zmuda | ............ | G06Q 20/10 |
| | | | | 709/217 |
| 2012/0218277 A1* | 8/2012 | Matilla | ............ | G09G 5/363 |
| | | | | 345/520 |
| 2016/0105691 A1* | 4/2016 | Zucchetta | ........ | H04N 21/2143 |
| | | | | 725/82 |
| 2016/0142482 A1* | 5/2016 | Mehta | .......... | H04L 67/1095 |
| | | | | 709/203 |
| 2017/0004803 A1* | 1/2017 | Bostick | ............ | G06F 1/1654 |

OTHER PUBLICATIONS

EP Search Report—dated Oct. 12, 2018.

\* cited by examiner

UNIQUE DISPLAY OUTPUT CONTROL FOR DUAL DISPLAYS

BACKGROUND

Typically, mobile device applications are targeted for mostly mobile users. Such that, having two or more unique screens is abnormal. In general, few applications exists to control two displays from a single device where each display presents unique output. Those applications that do exists are not dynamic in nature or are exclusively controlled from a server. That is, the formatting and location of information rendered to dual displays is static even though the content rendered in the formatting and at the locations within the screen can dynamically change.

SUMMARY

In various embodiments, methods and a device for dual unique output display control are presented.

According to an embodiment, a method for dual unique display format control on more than one display is presented. More particularly, first formatting instructions for a first display interfaced to a device are identified and second formatting instructions for a second display interfaced to the device are obtained. Formatting for content being rendered to the first display and the second display is simultaneously controlled by processing the first formatting instructions and the second formatting instructions on the device.

DETAILED DESCRIPTION

Figure 1:
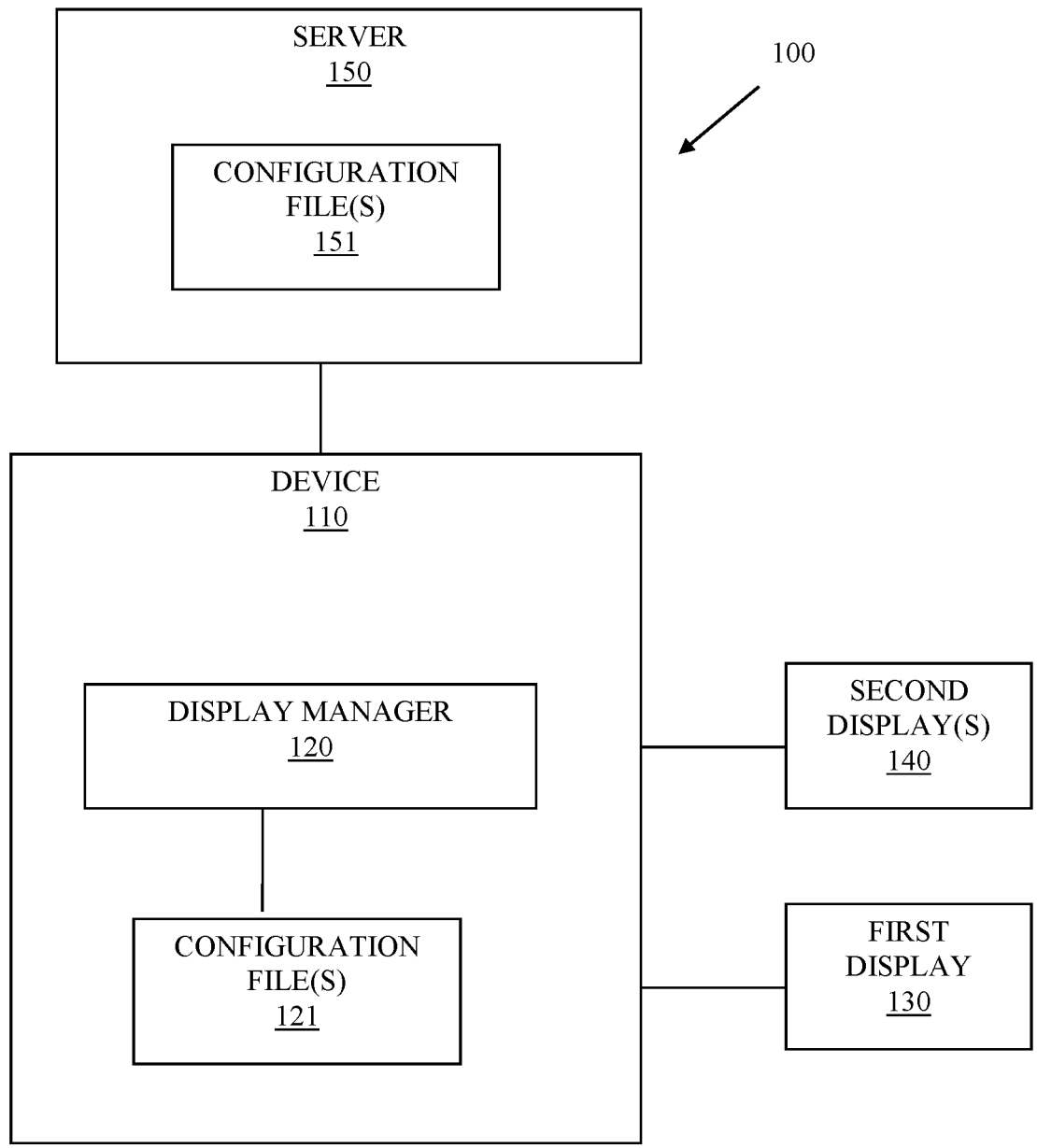
FIG. 1 is a diagram of a system for dual unique display format control on multiple displays, according to an example embodiment.

FIG. 1 is a diagram of a system 100 for dual unique display format control on multiple displays, according to an example embodiment. The various components are illustrated and the arrangement of the components is presented for purposes of illustration only. It is to be noted that other arrangements with more or less components are possible without departing from the dual unique display format control on multiple display teachings presented herein and below.

The techniques, methods, and system presented herein and below for dual unique display format control on multiple displays can be implemented in whole or in part in one, all, or some combination of the components shown with the system 100. The techniques and methods are programmed as executable instructions in memory and/or non-transitory computer-readable storage media and processed on one or more processors associated with the various components.

The discussion of the system 100 is within the context of a retail establishment having a plurality of digital signs and/or displays interfaced to Point-Of-Sale (POS) terminals.

It is noted that the system 100 is also applicable to any situation in which dual unique format control on multiple displays is utilized. Thus, the description that follows below is but one embodiment of the invention and it not intended to limit the invention to only retail-based digital signage and POS display control.

As used herein the term "format" or "formatting" includes one or more or all of: positions and sizes of different types of information on a display, a written language for the information, and visual effects for the information (brightness, contrast, font size, font type, font size, colors, bolding, underlining, italicizing, strobing, graphics, video, and other visual effects).

The system 100 includes a device 110 having a display manager 120 and one or more configuration files 121. The system also includes a first display 130 and at least one second display 140. Optionally, and in some embodiments, the system 100 also includes a server 150 having one or more configuration files 151.

The display manager 120 is initiated and executed on the device 110 during a boot of the device 110, such that the display manager 120 is continuously operational on the device 110. The configuration files 121 provide formatting instructions for each display 130 and 140 and are dynamically read and executed by the display manager, such that the format of content/information/data that is to be rendered to the displays 130 and 140 is decided and performed by the display manager 120 reading and executing the configuration files 121.

The instructions defined within the configuration files 121 can be in any consistent statement of code that the display manager 120 is configured to recognize and process. As one example, a configuration file 121 can include statements a follows: "region 1, size 100×100, centered 250, 550, color red, bold." The region instruction identifies a predefined screen that is to include variable defined content, which is determined by executing applications on the device 110. The size instruction is in pixel values (limited by the pixel dimensions of the displays 120 and 130 and/or the pixel density being rendered to the displays 120 and 130. The centered instruction defines a pixel coordinate position where the rendered screed (region) is to be centered within the display 120 or 130. The color instruction identifies a color for the application-defined content that is rendered on the display 120 or 130. The bold instruction indicates that the content is to have a visual effect of bolding. This is but one example, the instructions can include any capable formatting feature of the displays 120 and 130 that is predefined so as to permit the display manager 120 to execute the configuration instructions. It is also noted that underlying Operating Systems (OSs) may provide software libraries and commands that provide a fine-grain and less granular (more logical) definition for visual layouts on a display, these commands can be included as the user-defined configuration instructions. Thus, the example was presented for illustration and should not confine embodiments presented herein to any particular semantical or syntactical structure for the configuration instructions.

The configuration file 121 can be a single configuration file 121 that includes separate configuration instructions for each display 120 and 130 (such as through a display identifier provided in the single configuration file 121 that starts a block of configuration instructions by identifying a particular one of the displays 120 or 130 to which the block of instructions is to apply). Alternatively, each configuration file 121 can be unique to a particular one of the displays 120 or 130.

It is important to note, that because the configuration files 121 are files that are interpreted and executed by the display manager 120. The files 121 can be edited and modified while the device is executing applications. The display manager 120 also monitors during its execution for changes that are made to the configuration files 121. Metadata associated with the files or existing Operating System (OS) registered events can provide a mechanism for the display manager 120 to identify when the configuration files are changed. When a change (modification) to a configuration file 121 is detected by the display manager 120, the display manager 120 obtains the modified configuration file 121 and dynamically and in real time executes the configuration (formatting) instructions so that dynamic formatting changes are enforced on the appropriate display 130 or 140 (or both displays 130 and 140). This provides a mechanism by which the formatting of the displays 130 and 140 can be dynamically altered or modified during normal execution of applications on the device 110.

In an embodiment, the display manager 120 can also enforce scheduling instructions for the formatting changes that are made to the displays 130 or 140. The scheduling instructions can be embedded in the configuration files 121 or can be obtained through a separate scheduling interface or scheduling file. This permits the formatting of the displays 130 and 140 to change based on a user-defined schedule. The scheduling instructions can also be dynamically changed in the manner discussed above or through an Application Programming Interface (API) between the scheduling interface and the display manager 120.

In an embodiment, more than two displays are interfaced to the device 110. The display manager 120 can detect though OS provided events when a particular display 130 or 140 encounters a failure, such as Input/Output failure. In such a situation, the display manager 120 can use a third display as a failover display for the display 130 or 140 that is offline and provide the formatting and content that was to be rendered to the failed display 130 or 140 automatically to the third display. The failover instructions may also be provided in the configuration file 121 or provided as a separate failover file read by the display manager 120 to identify the third display for providing failover support to the failed display 130 or 140. This provides assurance in a retail setting that content is being provided to customers when a digital sign (failed display 130 or 140) fails during normal operation of the device 110. Typically two devices are needed to provided failover support (such as through a server); however, here failover is provided by a single device when a display failure is detected.

In an embodiment, the device 110 and the display 130 are an integral and integrated single device that is a digital sign.

In an embodiment, the device 110 is one of: a mobile device, a desktop computer, a wearable processing device, a tablet, a POS terminal, a Self-Service Terminal (SST), and a digital sign.

In an embodiment, the display 130 and the display 140 are different types of displays.

In an embodiment, the displays 130 and 140 are touch sensitive displays.

In an embodiment, the device 110 processes an Android® or open architecture Operating System (OS) and the display manager 120 is a customized and enhanced "ulayout" application that executes on the device 110 for purposes of checking for changed configuration files and dynamically producing "viewlayout" applications dynamically during continuous operation of the device 110.

In an embodiment, the system 100 includes a server 150 having a control application and a user-facing interface. The user-facing interface permits changes to the configuration files 121 located on the device 110 through a network connection between the server 150 and the device 110 (which can be wired, wireless, or a combination of wired and wireless). A user can access the interface from a user-operated device having a network connection to the server 150 to dynamically change the configuration instructions in the configuration files 121, change formatting scheduling, and/or change failover instructions. The control application dynamically pushes the configuration files 151 to the device 110 as modified configuration files 121. In an embodiment, the master version of the configuration files 121 is maintained and managed by the control application from the server as configuration files 151.

The display manager 120 executes on a device 110 (which as discussed above may itself be a digital sign) and dynamically controls multiple different user-defined formatting instructions for dual unique content output rendered to multiple displays 130 and 140. The formatting instructions reside in files 121 (and in some cases 151 as well) that can be dynamically modified and edited. This allows a single device 110 to manage multiple displays 130 and 140 with dual unique formatting, scheduling, and failover in a dynamic and real-time manner. Furthermore, the user-defined formatting, scheduling, and failover changes can be managed from a user-operated device through the server 150.

These embodiments and other embodiments are now discussed with reference to the FIGS. 2-4.

Figure 2:
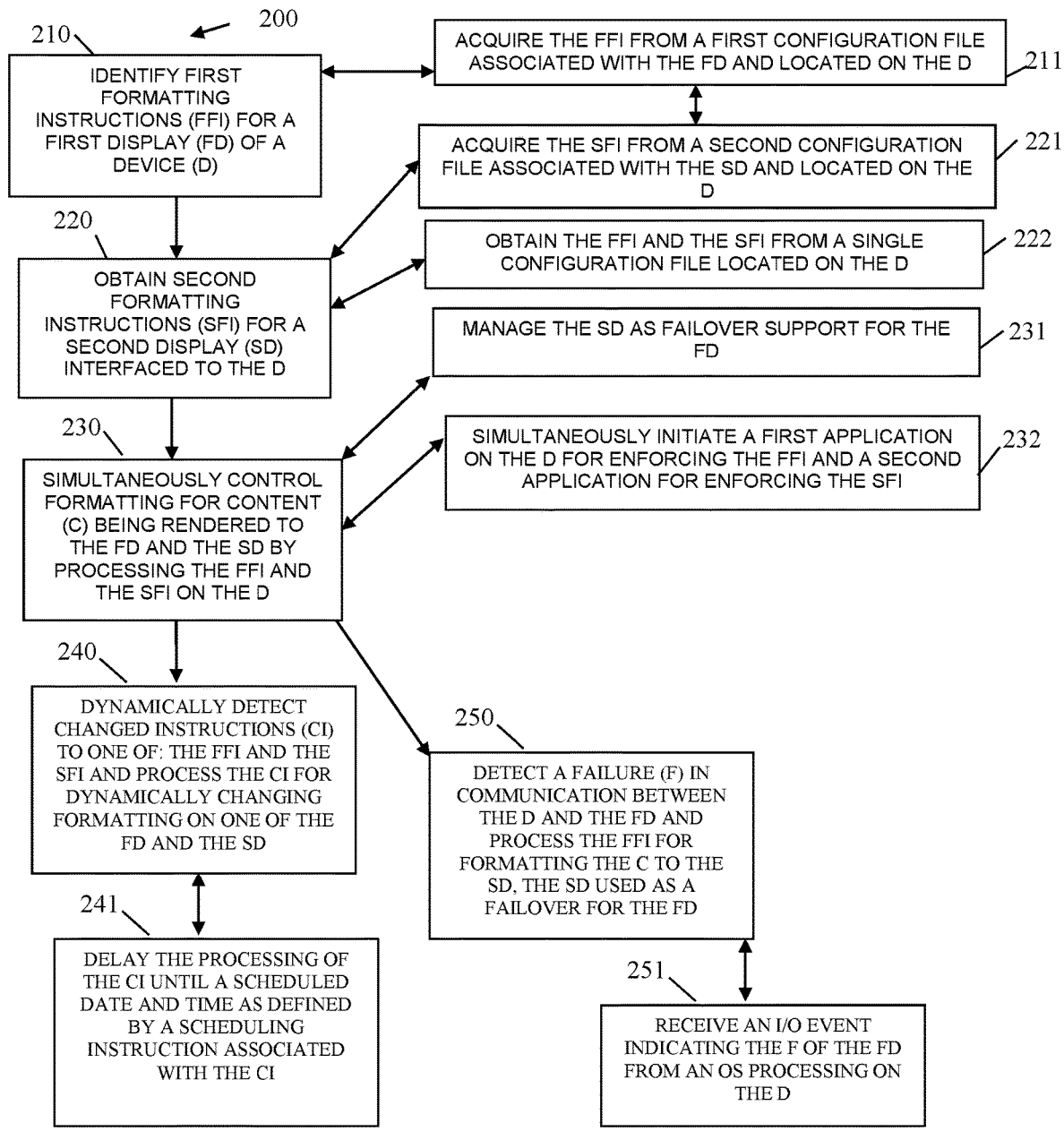
FIG. 2 is a diagram of a method for dual unique display format control on multiple displays, according to an example embodiment.

FIG. 2 is a diagram of a method 200 for dual unique display format control on multiple displays, according to an example embodiment. The software module(s) that implements the method 200 is referred to as a "display manager." The display manager is implemented as executable instructions programmed and residing within memory and/or a non-transitory computer-readable (processor-readable) storage medium and executed by one or more processors of a device. The processor(s) of the device that executes the display manager are specifically configured and programmed to process the display manager. The display manager may have access to one or more networks during its processing. The networks can be wired, wireless, or a combination of wired and wireless.

In an embodiment, the display manager is the display manager 120 of the FIG. 1.

In an embodiment, the device that executes the display manager 120 is the device 110.

In an embodiment, the device that executes the display manager 120 is a digital sign.

In an embodiment, the device that executes the display manager 120 is a POS terminal or a SST.

At 210, the display manager identifies first formatting instructions for a first display of the device (which executes the display manager).

According to an embodiment, at 211, the display manager acquires the first formatting instructions from a first configuration file associated with the first display and located on the device.

At 220, the display manager obtains second formatting instructions for a second display interfaced to the device.

In an embodiment of 211 and 220, at 221, the display manager acquires the second formatting instructions from a second configuration file associated with the second display and located on the device.

According to an embodiment, at 222, the display manager obtains both the first formatting instructions and the second formatting instructions from a single configuration file located on the device.

At 230, the display manager simultaneously controls formatting for content being rendered to the first display and the second display by processing the first formatting instructions and the second formatting instructions on the device.

In an embodiment, at 231, the display manager manages the second display as failover support for the first display.

In an embodiment, at 232, the display manager simultaneously initiates a first application on the device for enforcing the first formatting instructions and a second application for enforcing the second formatting instructions.

According to an embodiment, at 240, the display manager dynamically detects changed instructions for one of: the first formatting instructions and the second formatting instructions. In response, the display manager processes the changed instructions for dynamically changing formatting on one of: the first display and the second display.

In an embodiment of 240 and at 241, the display manager delays the processing of the changed instructions until a scheduled date and time as defined by a scheduling instruction associated with the changed instructions.

In an embodiment, at 250, the display manager detects a failure in communication between the device and the first display and processes the first formatting instructions for formatting the content to the second display. The second display used as a failover for the first device.

In an embodiment of 250 and at 251, the display manager receives an Input/Output (I/O) event from an OS that processes on the device and the event indicates the failure of the first device, which provides the indication to the display manager to override the second formatting instructions for the second display with the first formatting instructions of the failed first display.

Figure 3:
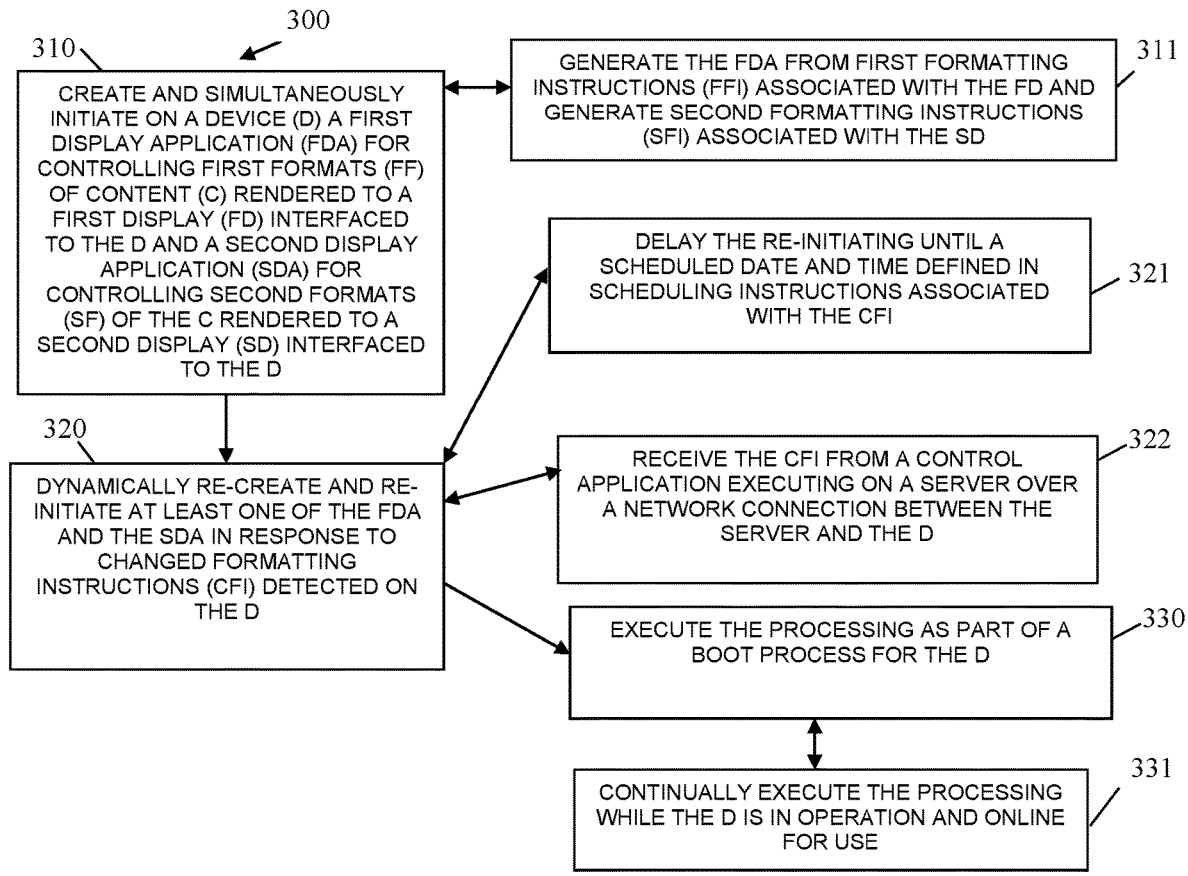
FIG. 3 is a diagram of another method for dual unique display format control on multiple displays, according to an example embodiment.

FIG. 3 is a diagram of another method 300 for dual unique display format control on multiple displays, according to an example embodiment. The software module(s) that implement the method 300 is referred to herein as a display controller. The display controller is implemented as executable instructions and programmed within memory and/or a non-transitory computer-readable (processor-readable) storage medium that executes on one or more processors of a device. The processors of the device are specifically configured to execute the display controller. The display controller may have access one or more networks; the networks can be wired, wireless, or a combination of wired and wireless.

The processing described herein for the display controller presents another and in some ways enhanced perspective of the method 200 for the display manager.

In an embodiment, the device that executes the display controller is the device 110.

In an embodiment, the device that executes the display controller is a digital sign.

In an embodiment, the device that executes the display controller is a POS terminal or a SST.

At 310, the display controller creates and simultaneously initiates on a device (the device that executes the display controller) a first display application for controlling first formats of content rendered to a first display interfaced to the device and a second display application for controlling second formats of the content rendered to a second display interfaced to the device.

In an embodiment, at 311, the display controller generates the first display application from first formatting instructions associated with the first device and generates second formatting instructions associated with the second device.

In an embodiment, the first and second display applications are dynamically generated based on the first and second formatting instructions defined for the first display and the second display in a single or multiple configuration files. In an embodiment, the configuration files are the configuration files 121.

At 320, the display controller dynamically re-creates and re-initiates at least one of the first display application and the second display application in response to changed formatting instructions detected on the device.

According to an embodiment, at 321, the display controller delays re-initiating until a scheduled date and time defined in scheduling instructions associated with the changed formatting instructions.

In an embodiment, at 322, the display controller receives the changed formatting instructions from a control application executing on a server over a network connection between the server and the device.

In an embodiment, at 330, the display controller executes on the device as part of a boot process for the device.

In an embodiment, at 331, the display controller continually executes while the device is in operation and online for use.

Figure 4:
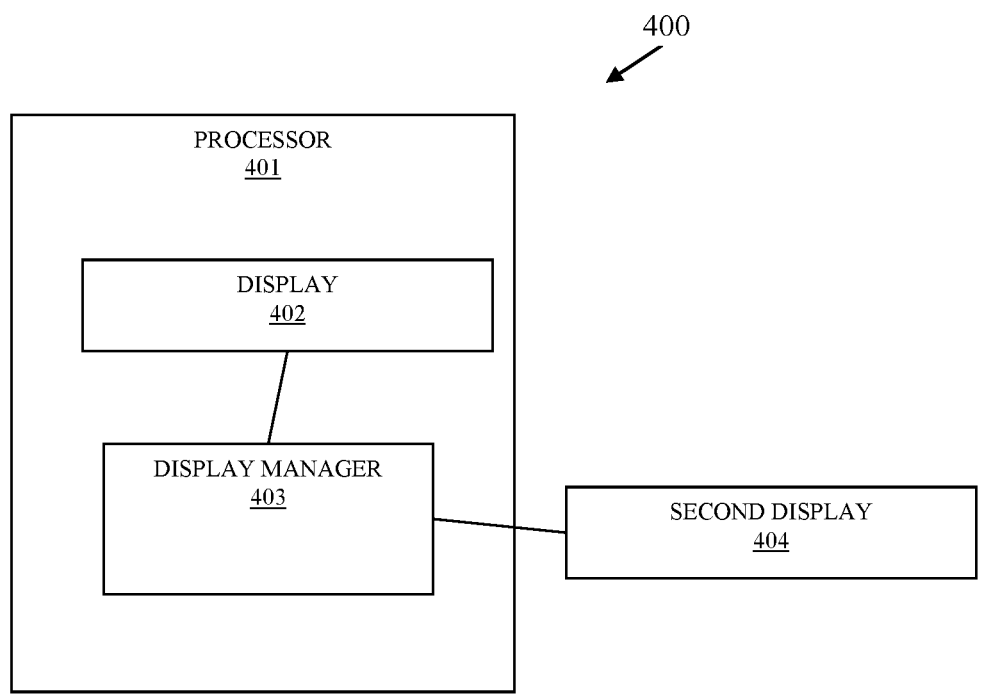
FIG. 4 is a diagram of a device for dual unique display format control on multiple displays, according to an example embodiment.

FIG. 4 is a diagram of a device 400 for dual unique display format control on multiple displays, according to an example embodiment. The components of the device 400 are programmed and reside within memory and/or a non-transitory computer-readable medium and execute on one or more processors of the device 400. The device 400 may have access and can communicate over one or more networks; and the networks can be wired, wireless, or a combination of wired and wireless.

The device 400 is configured and programed to perform the processing discussed above with the FIGS. 1-3.

In an embodiment, the device 400 is a digital sign.

In an embodiment, the device 400 is a POS terminal or a SST.

The device 400 includes a processor 401, a display 402, and a display manager 403. The device 400 is also interfaced to at least one second display 404.

The display manager 403 is configured to: i) execute on the processor 401, ii) initiate a first application for dynamically controlling formatting of content rendered on the display 402, iii) initiate a second application for dynamically controlling formatting of the content rendered on a second display 404, and iv), dynamically change at least one of the first application and the second application in response to detected changed formatting instructions for at least one of the display 402 and the second display 404.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
identifying first formatting instructions for a first display interfaced to a device;
obtaining second formatting instructions for a second display interfaced to the device; and
simultaneously controlling formatting for content being rendered to the first display and the second display by processing the first formatting instructions and the second formatting instructions on the device, and wherein simultaneously controlling further includes dynamically obtaining first scheduling instructions and the first formatting instructions from a first configuration file associated with the first display and dynamically obtaining second scheduling instructions and the second formatting instructions from a second configuration file, wherein the first scheduling instructions and the second scheduling instructions are a user-defined schedule provided by a user, and wherein simultaneously controlling further includes dynamically changing the first formatting instructions based on the first scheduling instructions and dynamically changing the second formatting instructions based on the second scheduling instructions, wherein dynamically changing the first formatting instructions and the second formatting instructions further includes receiving, dynamically and in real time, modifications to the first configuration file and the second configuration file from a user-operated device of the user and dynamically controlling formatting for the content rendered on the first display and the second display with the modifications rendered on the first display and the second display;
wherein the first formatting instructions and the second formatting instructions comprise statements that are interpreted during processing of the first formatting instructions and the second formatting instructions, each statement defining a region instruction for a screen to display variable defined content on the corresponding display, a size instruction defining pixel dimensions and a pixel density for the variable defined content, and a centered instruction defining a pixel coordinate position to center the variable defined content within the screen.

2. The method of claim 1 further comprising, dynamically detecting changed instructions to at least one of the first formatting instructions and the second formatting instructions and processing changed instructions for dynamically changing formatting on at least one of the first display and the second display.

3. The method of claim 2, wherein dynamically changing further includes delaying the processing of the changed instructions until a scheduled date and time as defined by at least one of the first scheduling instructions and the second scheduling instructions associated with the changed instructions.

4. The method of claim 1 further comprising, detecting a failure in communication between the device and the first display and processing the first formatting instructions for formatting the content to the second display, wherein the second display used as a failover for the first display.

5. The method of claim 4, wherein detecting further includes receiving an Input/Output (I/O) event indicating the failure of the first display from an Operating System (OS) processing on the device.

6. The method of claim 1, wherein simultaneously controlling further includes managing the second display as failover support for the first display.

7. The method of claim 1, wherein simultaneously controlling further includes simultaneously initiating a first application on the device for enforcing the first formatting instructions and a second application on the device for enforcing the second formatting instructions.

8. A method, comprising:
creating and simultaneously initiating on a device a first display application for controlling first formats of content rendered to a first display interfaced to the device and a second display application for controlling second formats of the content rendered to a second display interfaced to the device, wherein creating and simultaneously initiating further includes:
obtaining first formatting instructions and first scheduling instructions from a first configuration file, wherein obtaining further includes obtaining the first scheduling instructions as a user-defined schedule provided by a user;
generating the first display application from the first formatting instructions and providing the first scheduling instructions to the first display application;
obtaining second formatting instructions and second scheduling instructions from a second configuration file, wherein obtaining further includes obtaining the second scheduling instructions as the user-defined schedule provided by the user;
generating the second display application from the second formatting instructions and providing the second scheduling instructions to the second display application; and
dynamically re-creating and re-initiating at least one of the first display application and the second display application in response to changed formatting instructions detected on the device, and wherein re-creating and re-initiating further includes dynamically changing the first formats by the first data application based on the first scheduling instructions associated with the first display and dynamically changing the second formats by the second data application based on the second scheduling instructions associated with the second display, wherein dynamically re-creating and re-initiating further includes receiving, dynamically and in real time, the changed formatting instructions from a user-operated device of the user;
wherein the first display application and the second display application interpret the first formatting instructions and the second formatting instructions during processing of the first display application and the second display application, wherein the first formatting instructions and the second formatting instructions comprise statements, each statement defining a region instruction for a screen to display variable defined content on the corresponding display, a size instruction defining pixel dimensions and a pixel density for the variable defined content, and a centered instruction defining a pixel coordinate position to center the variable defined content within the screen.

9. The method of claim 8, wherein dynamically re-creating and re-initiating further includes delaying the re-initiating until a scheduled date and time defined in the first scheduling instructions or the second scheduling instructions associated with the changed formatting instructions.

10. The method of claim 8, wherein dynamically re-creating and re-initiating further includes receiving the changed formatting instructions from a control application executing on a server over a network connection between the server and the device.

11. The method of claim 8 further comprising, executing the method as part of a boot process for the device.

12. The method of claim 11 further comprising, continually executing the method while the device is in operation and online for use.

13. The method of claim 8 further comprising, detecting a failure in communication between the device and the first display and re-creating the first application with the first formatting instructions for controlling the first formats for the content on the second display, wherein the second display is controlled for failover support for the first display.

14. The method of claim 8 further comprising, providing the method as an enhanced version of an existing display manager provided with an Operating System (OS) of the device.

15. A device, comprising:
a processor;
a display integrated into the device;
and a display manager configured to: i) execute on the processor, ii) generate a first application from first formatting instructions obtained from a first configuration file, obtain first scheduling instructions from the first configuration file, initiate the first application on the device for dynamically controlling formatting of content rendered on the display, and providing the first scheduling instructions to the first application, wherein the first scheduling instructions provided by a user as a user-defined schedule, iii) generate a second application from second formatting instructions obtained from a second configuration file, obtain second scheduling instructions from the second configuration file, initiate the second application on the device for dynamically controlling formatting of the content rendered on a second display, and provide the second scheduling instructions to the second application, wherein the second scheduling instructions provided by the user as the user-defined schedule, and iv) dynamically change at least one of the first application and the second application in response to detected changed formatting instructions for at least one of the display and the second display, and wherein the first application dynamically changes formatting of the content based on the first scheduling instructions, wherein the second application dynamically changes formatting of the content based on the second scheduling instructions, and wherein the display manager is configured to dynamically update the first application or the second application based on user-defined changes to the formatting instructions received dynamically and in real time from a user-operated device of the user;
wherein the first application and the second application interpret the first formatting instructions and the second formatting instructions during processing of the first application and the second application, wherein the first formatting instructions and the second formatting instructions comprise statements, each statement defining a region instruction for a screen to display variable defined content on the corresponding display, a size instruction defining pixel dimensions and a pixel density for the variable defined content, and a centered instruction defining a pixel coordinate position to center the variable defined content within the screen.

16. The device of claim 15, wherein the device is one of: a digital sign, a Point-Of-Sale (POS) terminal, and a Self-Service Terminal (SST).

* * * * *